United States Patent
Holme et al.

(10) Patent No.: US 11,342,544 B2
(45) Date of Patent: *May 24, 2022

(54) PULSE PLATING OF LITHIUM MATERIAL IN ELECTROCHEMICAL DEVICES

(71) Applicant: QuantumScape Battery, Inc., San Jose, CA (US)

(72) Inventors: Timothy Holme, Mountain View, CA (US); Marie Mayer, Sunnyvale, CA (US); Ghyrn Loveness, Mountain View, CA (US); Zhebo Chen, Mountain View, CA (US); Rainer Fasching, Mill Valley, CA (US)

(73) Assignee: QuantumScape Battery, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/990,318

(22) Filed: Aug. 11, 2020

(65) Prior Publication Data

US 2021/0020897 A1 Jan. 21, 2021

Related U.S. Application Data

(60) Continuation of application No. 15/671,056, filed on Aug. 7, 2017, now Pat. No. 10,784,497, which is a (Continued)

(51) Int. Cl.
*H01M 4/04* (2006.01)
*H01M 10/052* (2010.01)
(Continued)

(52) U.S. Cl.
CPC .............. *H01M 4/045* (2013.01); *C25D 3/00* (2013.01); *C25D 5/18* (2013.01); *C25D 5/611* (2020.08);
(Continued)

(58) Field of Classification Search
CPC .... H01M 4/045; H01M 4/134; H01M 4/1395; H01M 4/38; H01M 4/382; H01M 10/052;
(Continued)

(56) References Cited

U.S. PATENT DOCUMENTS 3,907,603 A   9/1975   Kocherginsky et al.
3,923,550 A   12/1975  von Krusenstierna
(Continued)

FOREIGN PATENT DOCUMENTS

CN   201508873 U   6/2010
CN   102324559 A   1/2012
(Continued)

OTHER PUBLICATIONS

Cussen, Edward J., "Structure and Ionic Conductivity in Lithium Garnets," J. Mater. Chem., 2010, 20, 5167-5173.*
(Continued)

*Primary Examiner* — Brittany L Raymond
(74) *Attorney, Agent, or Firm* — Squire Patton Boggs (US) LLP

(57) ABSTRACT

The present invention is directed to battery system and operation thereof. In an embodiment, lithium material is plated onto the anode region of a lithium secondary battery cell by a pulsed current. The pulse current may have both positive and negative polarity. One of the polarities causes lithium material to plate onto the anode region, and the opposite polarity causes lithium dendrites to be removed. There are other embodiments as well.

7 Claims, 7 Drawing Sheets

Related U.S. Application Data division of application No. 14/288,406, filed on May 28, 2014, now Pat. No. 9,761,861.

(60) Provisional application No. 61/839,339, filed on Jun. 25, 2013.

(51) Int. Cl.

| | | |
|---|---|---|
| *C25D 5/18* | (2006.01) | |
| *H01M 4/1395* | (2010.01) | |
| *C25D 3/00* | (2006.01) | |
| *C25D 5/00* | (2006.01) | |
| *H01M 10/0585* | (2010.01) | |
| *H01M 4/38* | (2006.01) | |
| *H01M 4/134* | (2010.01) | |

(52) U.S. Cl.
CPC ....... *H01M 4/1395* (2013.01); *H01M 10/052* (2013.01); *H01M 10/0585* (2013.01); *Y02T 10/70* (2013.01)

(58) Field of Classification Search
CPC .......... H01M 10/0562; H01M 10/0585; C25D 3/00; C25D 5/18; Y02T 10/70; Y02E 60/10
See application file for complete search history.

(56) References Cited

U.S. PATENT DOCUMENTS

| | | | |
|---|---|---|---|
| 4,288,505 | A | 9/1981 | Joshi et al. |
| 4,668,593 | A | 5/1987 | Sammells |
| 5,352,544 | A | 10/1994 | Kumar et al. |
| 5,436,548 | A | 7/1995 | Thomas |
| 5,614,332 | A | 3/1997 | Pavelle et al. |
| 5,932,991 | A | 8/1999 | Ahuja et al. |
| 6,060,198 | A | 5/2000 | Snaper |
| 6,733,924 | B1 | 5/2004 | Skotheim et al. |
| 8,697,292 | B2 | 4/2014 | Kanno et al. |
| 9,399,404 | B2 | 7/2016 | Ose et al. |
| 10,116,003 | B2 | 10/2018 | Mayer et al. |
| 10,205,155 | B2 | 2/2019 | Holme |
| 2003/0031931 | A1 | 2/2003 | Obrovac et al. |
| 2006/0147806 | A1 | 7/2006 | Kugai et al. |
| 2006/0222954 | A1 | 10/2006 | Skotheim et al. |
| 2006/0246355 | A1 | 11/2006 | Min et al. |
| 2007/0160911 | A1 | 7/2007 | Senga et al. |
| 2009/0226816 | A1 | 9/2009 | Yoshida et al. |
| 2009/0311567 | A1 | 12/2009 | Visco et al. |
| 2010/0279176 | A1 | 11/2010 | Ogawa et al. |
| 2011/0229765 | A1 | 9/2011 | Barker et al. |
| 2011/0259505 | A1 | 10/2011 | Lee et al. |
| 2011/0262816 | A1 | 10/2011 | Amatucci |
| 2011/0311875 | A1 | 12/2011 | Lee et al. |
| 2012/0094185 | A1 | 4/2012 | Tsuchida et al. |
| 2012/0196186 | A1 | 8/2012 | Richard |
| 2013/0017441 | A1* | 1/2013 | Affinito ............... H01M 10/052 429/211 |
| 2013/0040200 | A1 | 2/2013 | Uetani et al. |
| 2013/0040208 | A1 | 2/2013 | Kanno et al. |
| 2014/0054492 | A1 | 2/2014 | Mukai et al. |
| 2014/0117291 | A1 | 5/2014 | Amatucci et al. |
| 2014/0162138 | A1 | 6/2014 | Fujiki et al. |
| 2014/0170493 | A1 | 6/2014 | Holme et al. |
| 2014/0186708 | A1 | 7/2014 | Pereira et al. |
| 2014/0234715 | A1 | 8/2014 | Fasching et al. |
| 2014/0272564 | A1 | 9/2014 | Holme et al. |
| 2014/0363745 | A1 | 12/2014 | Hirayama |
| 2015/0017548 | A1 | 1/2015 | Kato et al. |
| 2015/0037687 | A1 | 2/2015 | Kanno |
| 2015/0056520 | A1 | 2/2015 | Thokchom et al. |
| 2015/0099188 | A1 | 4/2015 | Holme et al. |
| 2015/0333307 | A1* | 11/2015 | Thokchom .......... H01M 50/449 429/144 |
| 2016/0104891 | A1 | 4/2016 | Holme |
| 2016/0226212 | A1 | 8/2016 | Oukassi et al. |
| 2016/0380315 | A1 | 12/2016 | Weicker et al. |
| 2017/0214084 | A1 | 7/2017 | Cheng et al. |
| 2017/0279155 | A1 | 9/2017 | Sun et al. |
| 2017/0324113 | A1 | 11/2017 | Mayer et al. |
| 2018/0198170 | A1 | 7/2018 | Fujita et al. |
| 2020/0020990 | A1 | 1/2020 | Oba |

FOREIGN PATENT DOCUMENTS

| | | |
|---|---|---|
| CN | 102983378 A | 3/2013 |
| CN | 103579707 A | 2/2014 |
| CN | 104541401 A | 4/2015 |
| CN | 105008006 A | 10/2015 |
| DE | 102009006128 A1 | 1/2010 |
| EP | 1639672 B1 | 12/2008 |
| GB | 2064209 A | 6/1981 |
| GB | 2333887 A | 8/1999 |
| JP | 57121172 A | 7/1982 |
| JP | H10241668 A | 9/1998 |
| JP | 2003123727 A | 4/2003 |
| JP | 2007273217 | 10/2007 |
| JP | 2009199936 A | 9/2009 |
| JP | 5255223 B2 | 8/2013 |
| JP | 2015185483 A | 10/2015 |
| KR | 20120054448 A | 5/2012 |
| KR | 20130051039 A | 5/2013 |
| WO | WO 2011/118801 A1 | 9/2011 |
| WO | WO 2014/186634 A2 | 11/2014 |
| WO | WO 2015/006144 A1 | 1/2015 |
| WO | WO 2015/054320 A2 | 4/2015 |
| WO | WO 2015/076944 A1 | 5/2015 |
| WO | WO 2015/130831 A1 | 9/2015 |
| WO | WO 2020/072524 A1 | 4/2020 |
| WO | WO/2020/176905 | 9/2020 |

OTHER PUBLICATIONS

Ahn et al., "Synthesis and Lithium Conductivities of $Li_2SiS_3$ and $Li_4SiS_4$," Mat. Res. Bull., 1989, vol. 24, pp. 889-897.

Andrews et al., "Infrared Spectra of $P_4S_{10}$ and its Decomposition Products in Solid Argon," Inorganic Chemistry, 1990, vol. 29, pp. 5222-5225.

Aotani et al., "Synthesis and electrochemical properties of lithium ion conductive glass, $Li_3PO_4$—$Li_2S$—$SiS_2$," Solid State Ionics, 1994, vol. 68, pp. 35-39.

Bartholomew et al., "Electrical properties of new glasses based on the $Li_2S$—$SiS_2$ system," Journal of Non-Crystalline Solids, 1999, vol. 256 & 257, pp. 242-247.

Chandrasekar, M.S., et al., "Pulse and pulse reverse plating—Conceptual, advantages and applications," Electrochimica Acta, 2008, vol. 53, pp. 3313-3322.

Creus et al., "The Use of Ionic and Mixed Conductive Glasses in Microbatteries," Materials Science and Engineering, 1989, B3, pp. 109-112.

Creus et al., "Thin films of ionic and mixed conductive glasses: their use in microdevices," Solid State Ionics, 1992, vol. 53-56, pp. 641-646.

Crowther, Owen et al., "Effect of Electrolyte Composition on Lithium Dendrite Growth," Journal of The Electrochemical Society, 2008, vol. 155, No. 11, pp. A806-A811.

Deiseroth et al., "$Li_6PS_5X$: A Class of Crystalline Li Rich Solids with an Unusually High Li+ Mobility," Angew. Chem. Int. Ed., 2008, vol. 47, pp. 755-758.

Ding, Fei et al., "Dendrite-Free Lithium Deposition via Self-Healing Electrostatic Shield Mechanism," J. Am. Chem. Soc., 2013, vol. 135, pp. 4450-4456.

Dini, Jack W., et al., "Electrodeposition of Copper," Chapter 2, Modern Electroplating, Fifth Edition, 2010, pp. 33-78.

Duluard et al., "Lithium conducting solid electrolyte $Li_{1.3}A_{0.3}Ti_{1.7}(PO_4)_3$ obtained via solution chemistry," Journal of the European Ceramic Society, 2013, vol. 33, pp. 1145-1153.

Eckert et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.

(56) References Cited

OTHER PUBLICATIONS

Gireaud, L. et al., "Lithium metal stripping/plating mechanisms studies: A metallurgical approach," Electrochemistry Communications, 2006, vol. 8, pp. 1639-1649.

Hayashi et al., "Characterization of $Li_2S$—$P_2S_5$ glass-ceramics as a solid electrolyte for lithium secondary batteries," Solid State Ionics, 2004, vol. 175, pp. 683-686.

Hayashi et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.

Hayashi et al., "Development of sulfide glass-ceramic electrolytes for all-solid-state lithium rechargeable batteries," J. Solid State Electrochem, 2010, vol. 14, pp. 1761-1767.

Hayashi et al., "Formation of $Li^+$ superionic crystals from the $Li_2S$—$P_2S_5$ melt-quenched glasses," J. Mater Sci, 2008, vol. 43, pp. 1885-1889.

Hayashi et al., "Formation of superionic crystals from mechanically milled $Li_2S$—$P_2S_5$ glasses," Electrochemistry Communications, 2003, vol. 5, pp. 111-114.

Hayashi et al., "Improvement of chemical stability of $Li_3PS_4$ glass electrolytes by adding MxOy (M=Fe, Zn, and Bi) nanoparticles," Journal of Materials Chemistry A, 2013, vol. 1, pp. 6320-6326.

Hayashi et al., "Preparation of $Li_2S$—$P_2S_5$ Amorphous Solid Electrolytes by Mechanical Milling," Journal of the American Ceramic Society, 2001, vol. 84, pp. 477-479.

Hirai et al., "Thermal and electrical properties of rapidly quenched glasses in the systems $Li_2S$—$SiS_2$—$Li_xMO_y(Li_xMO_y=Li_4SiO_4, Li_2SO_4)$," Solid State Ionics, 1995, vol. 78, pp. 269-273.

Hu et al., "Ionic Conductivity of Lithium Orthosilicate-Lithium Phosphate Solid Solutions," J. Electrochem. Soc., 1977, vol. 124, No. 8, pp. 1240-1242.

Jow, T.R et al., "Interface Between Solid Anode and Solid Electrolyte-Effect of Pressure on Li/LiI ($Al_2O_3$) Interface," Solid Sate and Ionics 9 & 10, 1983, pp. 695-698.

Kaib et al., "New Lithium Chalcogenidotetrelates, LiChT: Synthesis and Characterization of the $Li^+$-Conducting Tetralithium ortho-Sulfidostannate $Li_4SnS_4$," Chemistry of Materials, 2012, vol. 24, pp. 2211-2219.

Kamaya et al., "A lithium superionic conductor," Nature Materials, Sep. 2011, vol. 10, pp. 682-686; and Supllementary Information, DOI:10.1038/NMAT3066; 3 pages.

Kanamura, Kyoshi et al., "Electrochemical Deposition of Very Smooth Lithium Using Nonaqueous Electrolytes Containing HF," J. Electrochem. Soc., Jul. 1996, vol. 143, No. 7, pp. 2187-2197.

Kanno, "Lithium Ionic Conductor Thio-LISICON, the $Li_2S$—$GeS_2$—$P_2S_5$ System," Journal of the Electrochemical Society, 2001, vol. 148, pp. A742-A746.

Kanno, "Synthesis of a new lithium ionic conductor, thio-LISICON-lithium germanium sulfide system," Solid State Ionics, 2000, vol. 130, pp. 97-104.

Kennedy et al., "A Highly Conductive Li-Glass System: (1−x)(0.4$SiS_2$—0.6$Li_2S$)-xLiI," J. Electrochem. Soc., 1986, pp. 2437-2438.

Kim, Hansung, et al., "Preparation of PEM fuel cell electrodes using pulse electrodeposition," Journal of Power Sources, 2004, vol. 138, pp. 14-24.

Kobayashi et al., "Interfacial reactions at electrode/electrolyte boundary in all solid-state lithium battery using inorganic solid electrolyte, thio-LISICON," Electrochimica Acta, 2008, vol. 53, pp. 5045-5050.

Kondo et al., "New lithium ion conductors based on $Li_2S$—$SiS_2$ system," Solid State Ionics, 1992, vol. 53-56, pp. 1183-1186.

Leal-Gonzalez et al., "Structure of Lithium Sulfide, $LiGaS_2$," Acta. Cryst., 1990, C46, pp. 2017-2019.

Li et al., "An Artificial Solid Electrolyte Interphase Layer for Stable Lithium Metal Anodes," Adv. Mater., 2015, DOI: 10.1002/adma.201504526; pp. 1-6.

Liu et al., "Anomalous High Iconic Conductivity of Nanoporous R-$Li_3PS_4$," Journal of the American Chemical Society, 2012, 4 pages.

Liu et al., "High performance $Li_2S$—$P_2S_5$ solid electrolyte induced by selenide," Journal of Power Sources, 2014, vol. 260, pp. 264-267.

Lu, Yingying et al., "Stable Lithium Electrodeposition in Liquid and Nanoporous Solid Electrolytes," School of Chemical and Biomolecular Engineering, Cornell University, Ithaca, New York, 2014, 30 pages.

Mayers, Matthew Z., "Suppression of dendrite formation via pulse charging in rechargeable lithium batteries," The Journal of Physical Chemistry, 2012, vol. 116, pp. 26214-26221.

Menetrier et al., "Iconic conduction in $B_2S_3$—$Li_2S$-LiI glasses," Solid State Ionics, 1992, vol. 53-56, pp. 1208-1213.

Mercier et al., "Superionic Conduction in $Li_2S$—$P_2S_5$-LiI-Glasses," Solid State Ionics, 1981, vol. 5, pp. 663-666.

Minami et al., "Electrical and electrochemical properties of glass-ceramic electrolytes in the systems $Li_2S$—$P_2S_5$—$P_2S_3$ and $Li_2S$-$P_2S5_5$-$P_2O_5$," Solid State Ionics, 2011, vol. 192, pp. 122-125.

Minami et al., "Electrical and electrochemical properties of the 70$Li_2S$ (30−x)$P_2S_5$ x$P_2O_5$ glass-ceramic electrolytes," Solid State Ionics, 2008, vol. 179, pp. 1282-1285.

Minami et al., "Lithium ion conductivity of the $Li_2S$—$P_2S_5$ glass-based electrolytes prepared by the melt quenching method," Solid State Ionics, 2007, vol. 178, pp. 837-841.

Minami et al., "Preparation and characterization of lithium ion-conducting oxysulfide glasses," Solid State Ionics, 2000, vol. 136-137, pp. 1015-1023.

Minami et al., "Recent progress of glass and glass-ceramics as solid electrolytes for lithium secondary batteries," Solid State Ionics, 2006, vol. 177, pp. 2715-2720.

Minami, "Fast Ion Conducting Glasses," Journal of Non-Crystalline Solids, 1985, vol. 73, pp. 273-284.

Mizuno et al., "All Solid-State Lithium Secondary Batteries Using High Lithium Ion Conducting $Li_2S$—$P_2S_5$ Glass-Ceramics," Chemistry Letters, 2002, pp. 1244-1245.

Mizuno et al., "High lithium ion conducting glass-ceramics in the system $Li_2S$—$P_2S_5$," Solid State Ionics, 2006, vol. 177, pp. 2721-2725.

Mizuno et al., "New, Highly Ion-Conductive Crystals Precipitated from $Li_2S$—$P_2S_5$ Glasses," Advanced Materials, 2005, vol. 17, No. 7, pp. 918-921.

Morimoto et al., "Mechanochemical Synthesis of New Amorphous Materials of 60$Li_2S$•40$SiS_2$ with High Lithium Ion Conductivity," J. Am. Ceram. Soc., 1999, vol. 82, pp. 1352-1354.

Mukherjee, Rahul et al., "Defect-induced plating of lithium metal within porous graphene networks," Nature Communications, 2014, pp. 1-10.

Muramatsu et al., "Structural change of $Li_2S$—$P_2S_5$ sulfide solid electrolytes in the atmosphere," Solid State Ionics, 2011, vol. 182, pp. 116-119.

Murayama et al., "Material Design of New Lithium Ionic Conductor thio-LISICON, in the $Li_2S$—$P_2S_5$ System," Solid State Ionics, 2004, vol. 170, pp. 173-180.

Murayama et al., "Synthesis of New Lithium Ionic Conductor Thio-LISICON-Lithium Silicon Sulfides System," Journal of Solid State Chemistry, 2002, vol. 168, pp. 140-148.

Norrel et al., "Anion exchange of Oxygen by Sulfur in $GeO_2$-based glasses," Proceedings of SPIE, 2003, vol. 4990, pp. 87-96.

Ohtomo et al., "Characteristics of the $Li_2O$—$Li_2S$—$P_2S_5$ glasses synthesized by the two-step mechanical milling," Journal of Non-Crystalline Solids, 2013, vol. 364, pp. 57-61.

Ohtomo et al., "Electrical and electrochemical properties of $Li_2S$—$P_2S_5$-$P_2O_5$ glass-ceramic electrolytes," Journal of Power Sources, 2005, vol. 146, pp. 715-718.

Ohtomo et al., "Suppression of $H_2S$ gas from $Li_2S$—$P_2S_5$ glass electrolytes by the addition of $Li_2O$," The Electrochemical Society, 2012, Abstract #1189, 1 page.

Ooura et al., "A new lithium-ion conducting glass ceramic in the composition of 75$Li_2S$ • 5$P_2S_3$ • 20$P_2S_5$ (mol %)," Solid State Ionics, 2014, vol. 262, pp. 733-737.

Peled, E. et al., "Advanced Model for Solid Electrolyte Interphase Electrodes in Liquid and Polymer Electrolytes," J. Electrochem. Soc., Aug. 1997, vol. 144, No. 8, pp. L208-L210.

(56) References Cited

OTHER PUBLICATIONS

Pradel et al., "Ionically Conductive Chalcogenide Glasses," Journal of Solid State Chemistry, 1992, vol. 96, pp. 247-257.
Pradel et al., "Lithium Chalcogenide Conductive Glasses," Materials Chemistry and Physics, 1989, vol. 23, pp. 121-142.
Rao et al., "Synthesis and Li+ ion Migration Studies of $Li_6PS_5X$ (X=Cl, Br, I)," Mater. Res. Soc. Symp. Proc., 2011, vol. 1331, DOI: 10.1557/opl.2011.1424; 6 pages.
Sahu et al., "Air-Stable, High-Conduction Solid Electrolytes of Arsenic-Substituted $Li_4SnS_4$," Energy Environ. Sci., 2014, vol. 7, pp. 1053-1058.
Sakuda et al., "All-solid-state lithium secondary batteries using $LiCoO_2$ particles with pulsed laser deposition coatings of $Li_2S$—$P_2S_5$ solid electrolytes," Journal of Power Sources, 2011, vol. 196, pri. 6735-6741.
Sakuda et al., "Sulfide Solid Electrolyte with Favorable Mechanical Property for All-Solid-State Lithium Battery," Scientific Reports, 2013, 5 pages.
Seino et al., "A sulphide lithium super ion conductor is superior to liquid ion conductors for use in rechargeable batteries," Energy & Environmental Science, 2013, 5 pages.
Seino et al., "Synthesis and electrochemical properties of $Li_2S$—$B_2S_3$—$Li_4SiO_4$," Solid State Ionics, 2006, vol. 177, pp. 2601-2603.
Seino et al., "Synthesis of phosphorous sulfide solid electrolyte and all-solid-state lithium batteries with graphite electrode," Solid State Ionics, 2005, pp. 2389-2393.
Seino et al., Electronic Supplementary Material (ESI) to "A sulphide lithium super ion conductor is superior to liquid ion conductors for use in rechargeable batteries," Energy & Environmental Science, 2014, 4 pages.
Seo et al., "Fast lithium ion conducting solid state thin-film electrolytes based on lithium thio-germanate materials," Acta Materialia, 2011, vol. 59, pp. 1839-1846.
Seo et al., "Structural Properties of Lithium Thio-Germanate Thin Film Electrolytes Grown by Radio Frequency Sputtering," Inorganic Chemistry, 2011, vol. 50, pp. 2143-2150.
Sistla et al., "Structural studies on $xLi_2S$-$(1-x)P_2S_5$ glasses by X-ray diffraction and molecular dynamics simulation," Journal of Non-Crystalline Solids, 2004, vol. 349, pp. 54-59.
Sveinbjornsson et al., "Ionic Conductivity and the Formation of Cubic CaH2 in the $LiBH_4$—$Ca(BH_4)_2$ Composite," Journal of Solid State Chemistry, 2014, vol. 211, pp. 81-89.
Tachez et al., "Ionic Conductivity of and Phase Transition in Lithium Thiophosphate LizPS4," Solid State Ionics, 1984, vol. 14, pp. 181-185.
Takada et al., "Lithium ion conductive oxysulfide $Li_3PO_4$—$Li_3PS_4$," Solid State Ionics, 2005, vol. 176, pp. 2355-2359.
Takada et al., "Electrochemical behaviors of $Li^+$ ion conductor $Li_3PO_4$—$Li_2S$—$SiS_2$," Journal of Power Sources, 1993, vol. 43-44, pp. 135-141.
Takada et al., "Solid State Lithium Battery with Oxysulfide glass," Solid State Ionics, 1996, vol. 86-88, pp. 877-882.
Takahara et al., "Application of Lithium Metal Electrodes to All-Solid-State Lithium Secondary Batteries Using $Li_3PO_4$—$Li_2S$—$SiS_2$ Glass," Journal of the Electrochemical Society, 2004, vol. 151, Issue 9, pp. A1309-A1313.
Tatsumisago et al., "All-solid-state lithium secondary batteries using sulfide-based glass-ceramic electrolytes," Journal of Power Sources, 2006, vol. 159, pp. 193-199.
Teragawa et al., "Preparation of $Li_2S$—$P_2S_5$ solid electrolyte from N-methylformamide solution and application for all-solid-state lithium battery," Journal of Power Sources, 2014, vol. 248, pp. 939-942.
Trevey et al., "Glass-ceramic $Li_2S$—$P_2S_5$ electrolytes prepared by a single step ball billing process and their application for all-solid-sate lithium-ion batteries," Electrochemistry Communications, 2009, vol. 11, pp. 1830-1833.
Tu, Zhengyuan et al., "Nanostructured Electrolytes for Stable Lithium Electrodeposition in Secondary Batteries," Acc. Chem. Res., 2015, DOI: 10.1021/acs.accounts.5b00427, 10 pages.
U.S. Appl. No. 61/814,821, filed Apr. 23, 2013 entitled, "Nanostructured Materials for Electrochemical Conversion Reactions," 30 pages.
Ujiie et al., "Preparation and electrochemical characterization of $(100-x)(0.7Li_2S\ 0.3P_2S_5)$ xLiBr glass-ceramic electrolytes," Mater Renew Systain Energy, 2013, 8 pages.
Wilkinson, D.P. et al., "In-situ study of electrode stack growth in rechargeable cells at constant pressure," J. Electroanal. Chem., 1993, vol. 355, pp. 193-203.
Yamashita et al., "Formation and ionic conductivity of $Li_2S$—$GeS_2$—$Ga_2S_3$ glasses and thin films," Solid State Ionics, 2003, vol. 158, pp. 151-156.
Yamauchi et al., "Preparation and ionic conductivities of $(100-x)(0.75Li_2S\ 0.25P_2S_5)$ $xLiBH_4$ glass electrolytes," Journal of Power Sources, 2013, vol. 244, pp. 707-710.
Yan, Kai, "Ultrathin Two-Dimensional Atomic Crystals as Stable Interfacial Layer for Improvement of Lithium Metal Anode," Nano Lett., 2014, vol. 14, pp. 6016-6022.
Ye, Feng, et al., "Shape-controlled fabrication of platinum electrocatalyst by pulse electrodeposition," Electrochemistry Communications, 2008, vol. 10, pp. 476-479.
Zheng, Guangyuan et al., "Interconnected hollow carbon nanospheres for stable lithium metal anodes," Nature Nanotechnology, vol. 9, Aug. 2014, pp. 618-623.
Zoval, J. V., et al., "Electrochemical preparation of platinum nanocrystallites with size selectivity on basal plane oriented graphite surfaces," J. Phys. Chem. B, 1998, vol. 102, pp. 1166-1175.
Non-Final Office Action of U.S. Appl. No. 16/491,525 dated Mar. 11, 2022; 10 pages.

* cited by examiner

PULSE PLATING OF LITHIUM MATERIAL IN ELECTROCHEMICAL DEVICES

CROSS-REFERENCES TO RELATED APPLICATIONS

This application is a continuation of U.S. patent application Ser. No. 15/671,056, filed Aug. 7, 2017, entitled "PULSE PLATING OF LITHIUM MATERIAL IN ELECTROCHEMICAL DEVICES," which a division of U.S. patent application Ser. No. 14/288,406, filed May 28, 2014, entitled "PULSE PLATING OF LITHIUM MATERIAL IN ELECTROCHEMICAL DEVICES," which claims priority to, and the benefit of, U.S. Provisional Patent Application No. 61/839,339, filed Jun. 25, 2013, entitled "PULSE PLATING OF LITHIUM MATERIAL IN ELECTROCHEMICAL DEVICES", the contents of each of which is incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to battery system and operation thereof.

In the recent years, with a shortage of fossil-fuel based energy resources and adverse environmental effects from the consumption of fossil fuels, both the public and private sectors have made substantial investments into developing clean technologies. An important aspect of clean technologies is energy storage, or simply battery systems. In the past, many battery types have been developed and used, with their respective advantages and disadvantages. For its chemical properties, including high charge density, lithium material has been used in various parts of a battery. For example, in a rechargeable lithium-ion battery, lithium ions move from negative electrode to the positive electrode (or cathode) during discharging process; lithium ions move from positive electrodes to negative electrode during charging process. Typically, the negative electrode (or anode) accommodates and stores lithium ions when the battery is charged. In conventional lithium battery systems, negative electrodes typically comprise materials, such as graphite and/or organic compounds that store migrating lithium ion material.

Unfortunately, existing anode materials and structures thereof are often inadequate. Therefore, it is desirable to have improved anode materials, structures, and processes thereof.

DETAILED DESCRIPTION OF THE INVENTION

The present invention is directed to battery system and operation thereof. In an embodiment, lithium material is plated onto the anode region of a lithium secondary battery cell by a pulsed current. The pulse current may have both positive and negative polarity. One of the polarities causes lithium material to plate onto the anode region, and the opposite polarity causes lithium dendrites to be removed. There are other embodiments as well.

Figure 1:
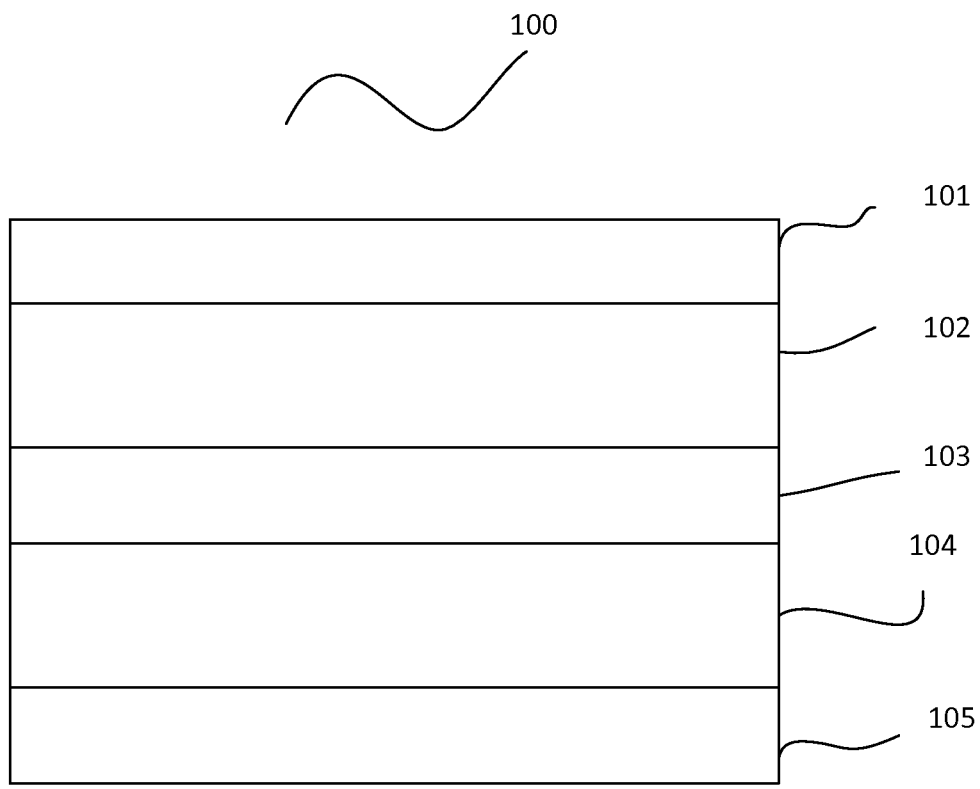
FIG. 1 is a simplified diagram illustrating a battery cell having a lithiated anode according to an embodiment of the present invention.

As described above, lithium ions move through electrolyte and between positive and negative electrodes upon charging and discharging process. Typically, the anode region of a lithium battery cell comprises material such as graphite to store lithium ions when the battery is charged. According to embodiments of the present invention, lithium ions are plated onto the current collector at the side of the negative electrode. FIG. 1 is a simplified diagram illustrating a battery cell having a lithiated anode according to an embodiment of the present invention. This diagram is merely an example, which should not unduly limit the scope of the claims. One of ordinary skill in the art would recognize many variations, alternatives, and modifications.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a battery cell having a lithiated anode according to an embodiment of the present invention. This diagram is merely an example, which should not unduly limit the scope of the claims. One of ordinary skill in the art would recognize many variations, alternatives, and modifications. As shown in FIG. 1, a battery cell 100 includes a cathode current collector 101, a cathode region 102, an electrolyte region 103, an anode region 104, and an anode current collector 105. The cathode current collector 101 is electrically conductive. In various embodiments, the cathode current collector 101 comprises metal material, such as aluminum, carbon-coated aluminum, nickel, copper, lithium, polymer material with metal plating, and/or other types of material. The cathode region 102 as shown interfaces with the cathode current collector 101. For example, the cathode region 102 is lithiated and can accommodate lithium ions when the battery cell 100 is discharged. The cathode region is preferably fabricated in the lithiated, (i.e. discharged state), since it will be less reactive in that state. Alternatively, the cathode could be for a lithium-air (Li—$O_2$) cell or a lithium sulfur (Li—S) cell. For example, Li—$O_2$ and Li—S refers to elemental lithium, oxygen, and sulfur. Depending on the implementation, materials in their elemental forms can be easier to process than compound form.

The cathode region 102 is coupled to the electrolyte 103. According to embodiments of the present invention, the electrolyte 103 is a solid electrolyte material with a high level of ionic conductivity. For example, the ionic conductivity of the electrolyte can be at least $10^{-7}$ S/cm. The electrolyte may be a ceramic material. Depending on the implementation, electrolyte may also be a polymer, ionic liquid, gel, or liquid electrolyte. The electrolyte may comprise additives such as $CsPF_6$ or HF that inhibit dendrite formation. Exemplary ceramic electrolyte materials include, but are not limited to, LiPON, $LiAlF_4$, $Li_3N$, Li β" alumina, $(LiLa)TiO_3$, $Li_9AlSiO_8$, garnets such as $Li_7La_3Zr_2O_{12}$, anti-perovskites such as $Li_3ClO$, oxide glasses, Lisicon structures such as $Li_{14}Zn(GeO_4)_4$, $Li_{3.6}Si_{0.6}P_{0.4}O_4$, sulfide glasses, oxysulfide glasses, sulfide or oxysulfide glass ceramics, sulfide crystals such as $Li_3PS_4$, $Li_{10}XP_2S_{12}$ (X=Si, Ge, Sn and combinations thereof), $Li_7P_3S_{11}$, or $Li_{3.25}Ge_{0.25}P_{0.75}S_4$. The electrolyte may be comprised of two or more layers of lithium ion conducting materials. Interfacing with the other side of the electrolyte 103 is an anode region 104. In various embodiments, the anode region 104 is formed by applying a pulsed current. More specifically, during the charging process of the battery cell 100, lithium ions migrate from cathode region 102 through the electrolyte 103 and plate onto the anode region 104.

The anode current collector 105 provides electrical contacts to the anode region 104. For example, the anode current collector material interfacing the anode region 104 is metal, and the anode current collector interface allows lithium ion to plate onto the metal material during the charging process. As a part of the battery, the anode current collector is a metal material that does not alloy with lithium according to a specific embodiment. Depending on the implementation, the anode current collector may be a metal or a polymer coated with a non-alloying material. As an example, suitable non-alloying materials include titanium nitride, tungsten, molybdenum, copper, nickel, iron or stainless steel. The anode current collector may optionally include a layer of a metal that enhances plating uniformity such as indium, aluminum, or magnesium. The anode current collector may also optionally include a layer that improves adhesion between current collector and electrolyte during lithium stripping (battery discharge). The anode current collector may be a lithium foil or a deposited lithium layer. As an example, battery structures are described in U.S. Provisional Patent Application No. 61/814,821, entitled "NANOSTRUCTURED MATERIALS FOR ELECTROCHEMICAL CONVERSION REACTIONS", filed 23 Apr. 2013, which is incorporated by reference herein for all purposes.

According to various embodiments, the anode region 104 is formed in situ with regard to the battery cell. More specifically, the battery cell 100, before its first operation, does not have the anode region 104; the electrolyte 103 directly interfaces with the anode current collector 105. When the battery cell 101 is charged for the first time (i.e., applying pulse current between the cathode and anode current collector), the anode region 104 is formed by lithium ions plating onto the anode current collector 105. When the battery cell 101 is discharged, the lithium ions at the anode region migrate to the cathode region 102 through the electrolyte 103. The detailed process of forming the anode region with pulsed current is described below.

Figure 2:
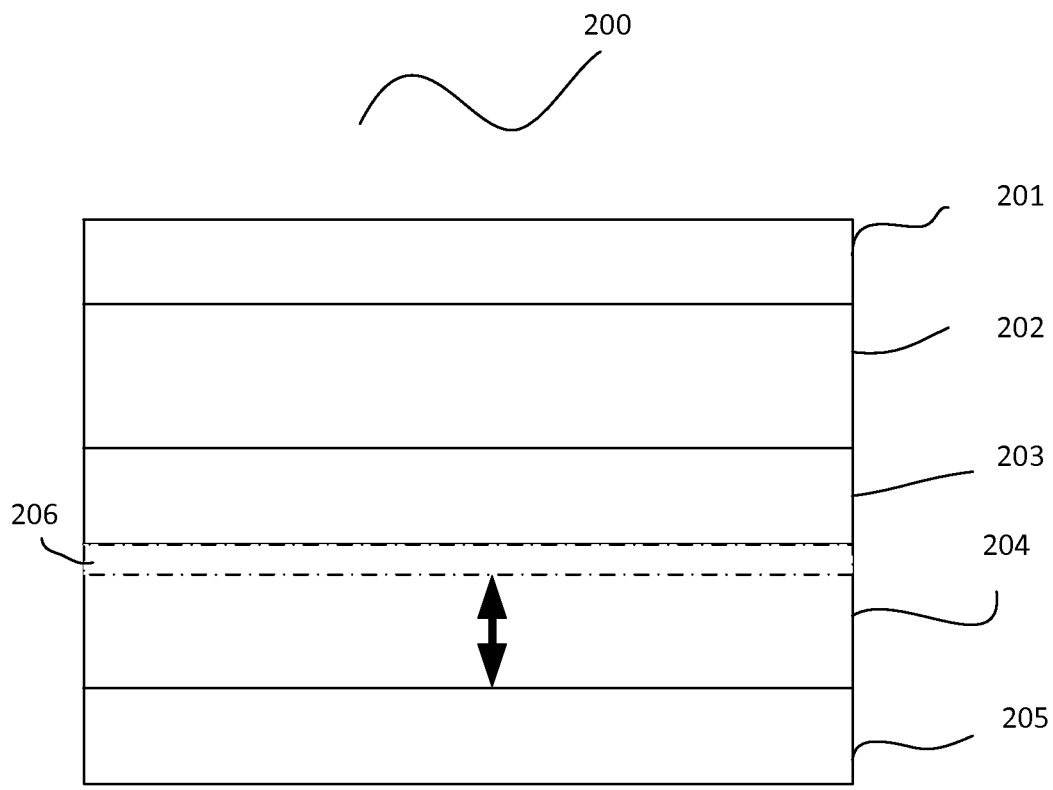
FIG. 2 is a simplified diagram illustrating a battery cell in a charging mode according to an embodiment of the present invention.

FIG. 2 is a simplified diagram illustrating a battery cell in a charging mode according to an embodiment of the present invention. This diagram is merely an example, which should not unduly limit the scope of the claims. One of ordinary skill in the art would recognize many variations, alternatives, and modifications. In FIG. 2, a battery cell 200 includes a cathode current collector 201, a cathode region 202, an electrolyte region 203, an anode region 204, and an anode current collector 205. The cathode region is preferably fabricated in a substantially lithiated, i.e. discharged state. The anode region is preferably fabricated in a substantially delithiated state and may be lithiated upon the first charge of the battery. The anode region 204, positioned between the electrolyte 203 and the anode current collector 205, expands during the charging process, as lithium ions migrate into the anode region. For example, the electrolyte 203 is flexible and thus accommodates the volume expansion of the anode region 204. In various embodiments, the electrolyte 203 comprises solid electrolyte material and has a thickness of less than 10 microns. Depending on the implementation, the electrolyte material can also have a thickness of less than 50 microns. The electrolyte interfacing with the lithium metal anode is characterized by a permittivity $\varepsilon$ and a conductivity $\sigma$, and the majority of current pulses are of a duration longer than $\varepsilon\varepsilon_0/\sigma$, where $\varepsilon_0$ is the permittivity of free space. The permittivity may be measured by means known to those skilled in the art, for example by measuring the high frequency capacitance of the sample and extracting the permittivity from the formula $C=\varepsilon\varepsilon_0$ A/d, where A is the area of the electrolyte and d is the thickness of the electrolyte. The conductivity may be measured by means known to those skilled in the art, for example by electrochemical impedance spectroscopy or by DC galvanostatic plating at a fixed current of I and measuring the potential V, and calculating $\sigma=(I*d)/(V*A)$. The characteristic time constant of the electrolyte interface is $t=RC$, where R is the resistance and C is the capacitance. This time constant may also be expressed $t=RC=(d/A\sigma)*(\varepsilon\varepsilon_0 \ A/d) = \varepsilon\varepsilon_0/\sigma$ and gives the characteristic time that ions move in the electrolyte. It is to be understood that pulses are preferably of a duration longer than this time constant to allow ions sufficient time to move in response to the applied pulse duration. For electrical performance and reliability, it is desirable for the anode region 204 to be substantially uniform. Undesirably, during the charging process, dendrites form near the anode region 204. For example, FIG. 2 illustrates that dendrite region 206 formed between the anode region 204 and the electrolyte 203. It is to be understood that the dendrites may form in other regions near the anode region 204 and in the electrolyte as well. It is to be understood that lithium plating may be non-uniform in several different morphologies. For example, it may be dendrite-like and/or it may be "mossy", or high surface area. For example, the non-uniform plating of lithium material may accumulate and worsen over time, thereby degrading battery performance and potentially leading to device failure.

In general, lithium dendriting is undesirable, as it can be a cause of battery failure. More specifically, dendrite formation may create a short circuit between the cathode region 202 and the anode region 204, and such short may constitute a catastrophic failure. Lithium dendrites sometimes cause problems by creating a thermal runaway that leads to safety events. To solve or otherwise alleviate the dendrite formation problem, conventional battery cells typically use barrier structures that employ oversize graphite (and/or other material) to prevent lithium plating and dendrite formation. Unfortunately, anodes typically have low energy density due to the graphitic anode rather than lithium metal anode and further require exotic chemical additives and formation cycles to form a solid electrolyte interface (SEI). Thus it is to be appreciated that embodiments of the present invention provide techniques of charging the lithiated anode region using pulsed current, which also removes lithium dendrites. It is to be appreciated that by using pulse current to charge battery cells according to embodiments of the present invention, dendriting problems can be alleviated or eliminated inexpensively, without lowering the energy density of battery cells. It is to be appreciated that the pulsed plating may be applied as part of the formation cycle(s) to condition the cell and create a lithium metal anode in situ. This technique may be applied to lithium metal anodes and to other anodes where dendriting is to be avoided, for example, Sn, Si, Ge, graphite, and alloys of these compounds.

Figure 3A:
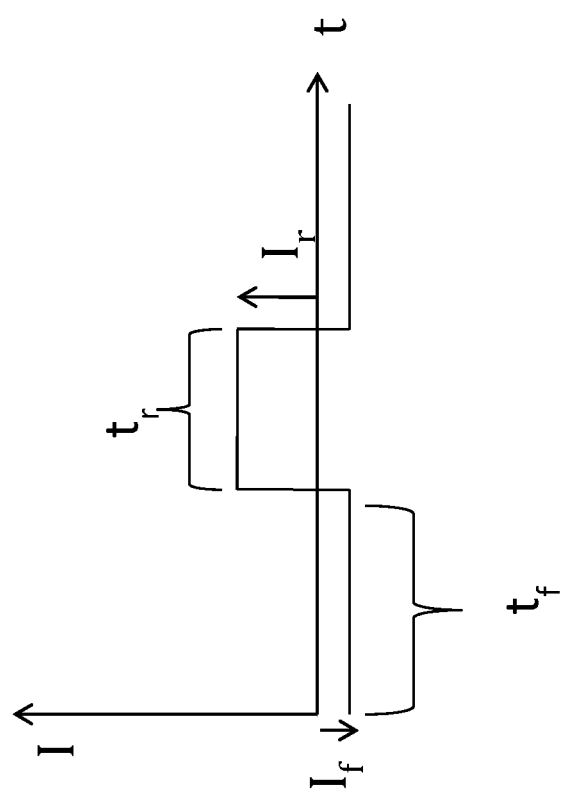
FIGS. 3A and 3B are simplified diagrams illustrating a process of applying pulse current to a battery cell according to an embodiment of the present invention.
Figure 3B:
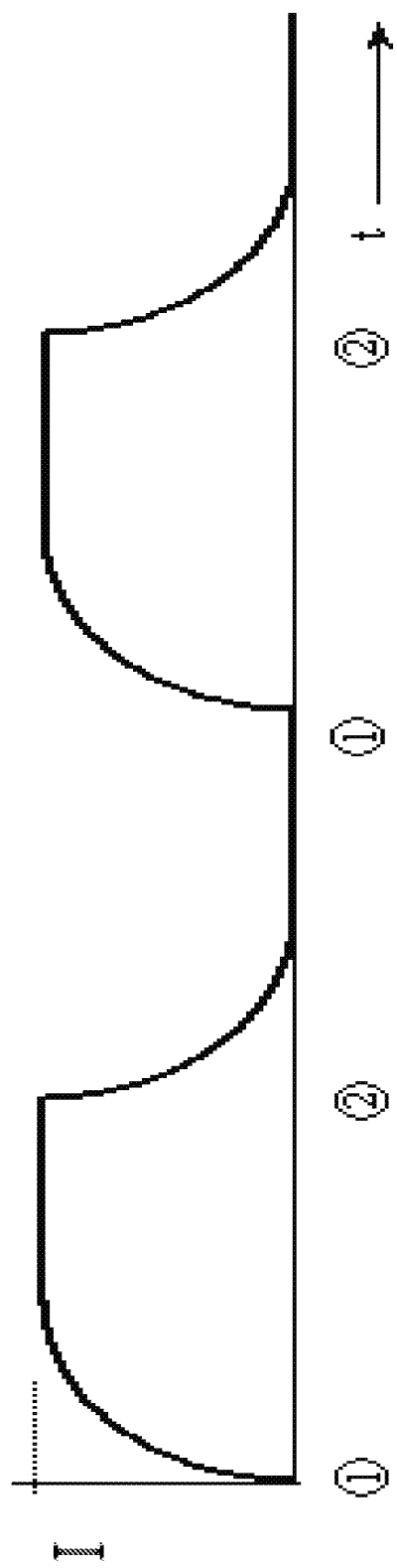

FIG. 3A is a simplified diagram illustrating a process of applying pulsed current to a battery cell according to an embodiment of the present invention. This diagram is merely an example, which should not unduly limit the scope of the claims. One of ordinary skill in the art would recognize many variations, alternatives, and modifications. The waveform shown in FIG. 3 is a current waveform for galvanostatic pulse (and/or reverse-pulse) plating of lithium material onto the anode (or anode current collector). On the waveform, $I_f$ is the forward (plating) current, $I_r$ is the reverse (stripping) current, $t_f$ is the time during which the forward current is applied, and $t_r$ is the time during which the reverse current is applied. When $I_f$ is applied to the cathode and anode current collectors over $t_f$, lithium ions move from cathode to anode and plate onto the anode region and/or the anode current collector. The magnitudes of $I_f$ and the duration $t_f$ are specifically calibrated to promote lithium plating uniformity and avoid dendrite formation. The amount of lithium plating is a function $I_f$ and $t_f$, or total charge applied during $t_f$. In various embodiments, the pulse current is characterized by a net current density of 0.1 mA/cm² to 50 mA/cm². Although the schematic in FIG. 3 presents substantially square waveforms for the plating and stripping current, other waveforms may be used as well. For example, the waveform may be sawtooth, rounded as in FIG. 3B, or arbitrary.

Figure 4:
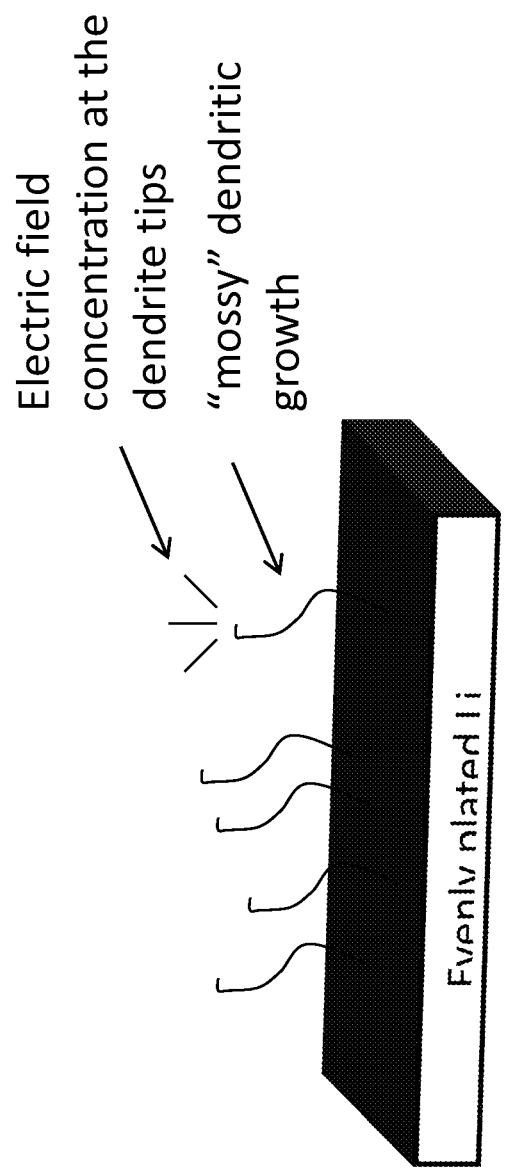
FIG. 4 is a simplified diagram illustrating formation of dendrite.

During $t_r$, current $I_r$, which is opposite in polarity relative to the $I_f$, is applied to the battery cell. It is to be appreciated that while $I_f$ and $I_r$ are respectively shown as negative and positive, the polarities are relative to the battery cell terminals; it is to be understood that $I_f$ is meant to represent a polarity for lithium plating, and $I_r$ for lithium stripping. In certain embodiments, the magnitude of $I_r$ is substantially zero. A non-zero magnitude of $I_r$ is applied for the purpose of removing dendrite that may have formed during $t_f$. More specifically, during $t_r$, lithium is preferentially stripped from the tip of dendrites due to the field concentration around dendrite tips (the very effect that causes dendritic growth). FIG. 4 is a simplified diagram illustrating formation of dendrite. As shown in FIG. 4, electric field concentrates at dendrite tips, which causes a "mossy" dendritic growth. Now referring back to FIG. 3; the total amount of lithium material to be removed is less than the total amount of lithium that has plated.

According to various embodiments, both $t_f$ and $t_r$, the forward and reverse time, should be longer than the RC time constant of Li plating at the interface between the lithium and electrolyte. For example, $t_f$ and $t_r$ duration are on the order of 1 ms or greater.

The plating efficiency is the forward charge plated $(Q_{plate}=\int I_{plate}dt_{plate})$ less the charge stripped $(Q_{strip}=\int I_{strip}dt_{strip})$ divided by total charge plated, as expressed in the equation below:

$$\eta = \frac{Q_{plate} - Q_{strip}}{Q_{plate}}$$

The plating efficiency $\eta$ is typically greater than 50%. However, a "clean-up" cycle may be performed in which the plating efficiency is less than 50%, and may be negative. For the pulsed current, the average net current is defined by the equation below:

$$I_{avg,net} = \frac{\int I_{plate}dt - \int I_{strip}dt}{t_{tot}}$$

To increase the efficiency, the greatest ratio of $Q_{plate}/Q_{strip}$ is desired. In the limit that $Q_{strip} \rightarrow 0$, only forward plating is performed, which may result in dendrites. It is be appreciated that there is an optimum range of the 4 parameters, as explained below, that leads to effective suppression of dendrites while retaining high efficiency. One example setting is to use a substantially square current waveform with $I_{plate}=I_{strip}=0.1$ mA/cm² and $t_f=25$ ms, $t_r=5$ ms. Another example is to use a substantially square current waveform with $I_{plate}=I_{strip}/x$ where $1 \le x \le 10$ and $t_f=t_r*y$ where $1.1x \le y \le 5x$. Another example is to use an RC-shaped waveform with similar ranges for the times and maximum current magnitudes. As $t_{plate}$ and $t_{strip}$ increase at a fixed ratio of $t_{plate}/t_{strip}$, it is to be appreciated that the pulsed plating effectively approaches DC plating. Therefore, many of the benefits of pulsed plating are derived at shorter plating and stripping times, for example $t_{plate}$<60 s, or $t_{plate}$<15 s or $t_{plate}$<2 s or $t_{plate}$<100 ms or $t_{plate}$<50 ms.

The stripping current is preferably large enough to be in the IR-limited regime as opposed to the activation-limited regime. This may be determined by a Tafel plot of the overpotential versus the logarithm of the current density. The activation-limited regime at low current density will appear linear on this plot. A deviation from linearity often signifies a transition into the IR-limited regime. It is to be appreciated that stripping in the IR limited regime will enhance the selectivity of stripping from a dendrite tip since the ohmic (IR) drop will be lower for current traveling to a protrusion (dendrite)) than for current traversing the entire electrolyte to the evenly plated material.

It is to be appreciated that the pulsed current can have multiple cycles, even though FIG. 3 only one cycle that includes $t_f$ and $t_r$. It is to be understood that to fully charge a battery cell, a large number of cycles may be required. Depending on the implementation, pulse magnitude and duration may be variable too. In the case where the anode is fully discharged (contains no lithium), pulse plating may be especially useful to nucleate a good smooth layer. Lithium plating is known to occur with some overpotential, therefore it will nucleate in localized areas and further plating will occur preferentially on top of those areas resulting in an increasing roughness. Pulse and pulse/reverse-pulse plating may alleviate this issue.

The pulse current illustrated in FIG. 3 can be used for forming anode region and/or charging a battery cell. In a specific embodiment, a battery cell as manufactured does not have an anode region; lithium ions are stored at the cathode region, and the anode current collector interfaces directly with the electrolyte. Upon first charging of the battery cell, with pulsed current illustrated in FIG. 3, the lithium ions at the cathode region migrate across the electrolyte to form an anode region between the anode current collector and the electrolyte. With the anode region formed, the future charging processes, which can be performed with pulsed current, redeposit lithium ions to the anode region.

Figure 5:
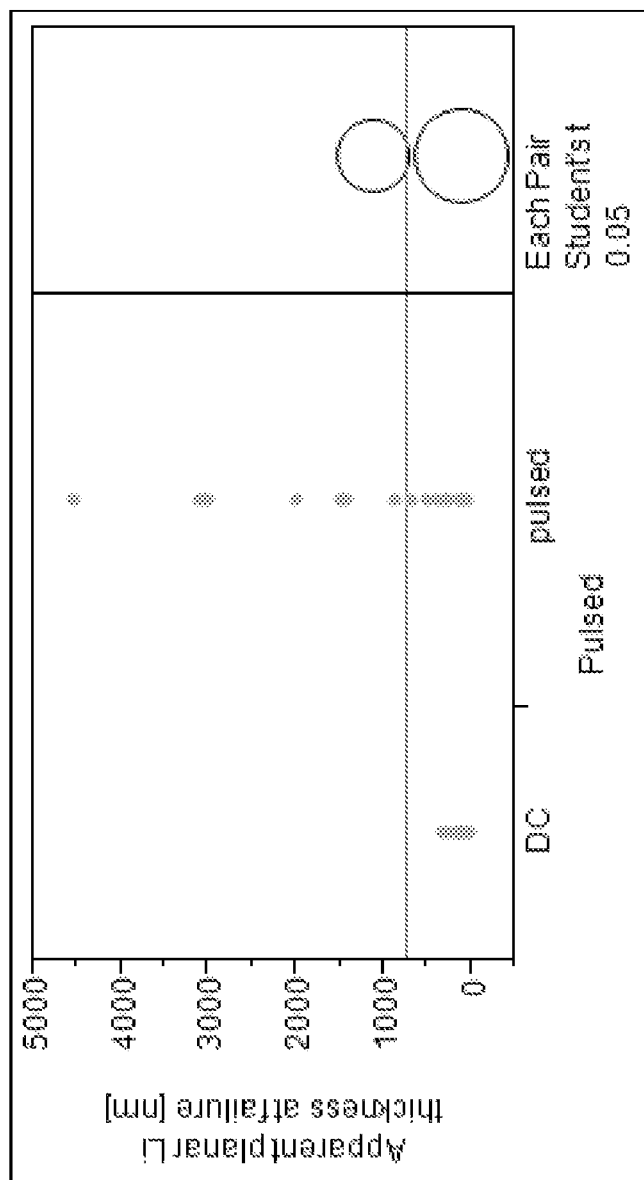
FIG. 5 is a simplified diagram illustrating lifetime of a battery cell operated with pulse current of about 15 uA.

It is to be appreciated that the charging techniques with pulsed current according to embodiments of the present invention provide numerous benefits. FIG. 5 presents experimental data comparing the lifetime of a battery cell operated with DC plating versus a pulse current of about $I_r = I_f = 15$ uA over an area of 0.28 cm². The results show a statistically significant difference that the pulse plating prolongs lifetime to failure of the cell. At 15 uA, the sample battery cell that underwent pulsed plating with square pulses with $t_f = 125$ ms and $t_r = 50$ ms had a statistically significant longer lifetime. The test platform used was an iron back electrode contact, LiPON solid state electrolyte of 400 nm thickness with a pressed Li foil top electrode that served as the Li source. The ratio of the pulse/strip current was held to 2.5 for all cases. Compared to charging with continuous DC current, charging with charged current provide much better reliability and lifetime.

Figure 6:
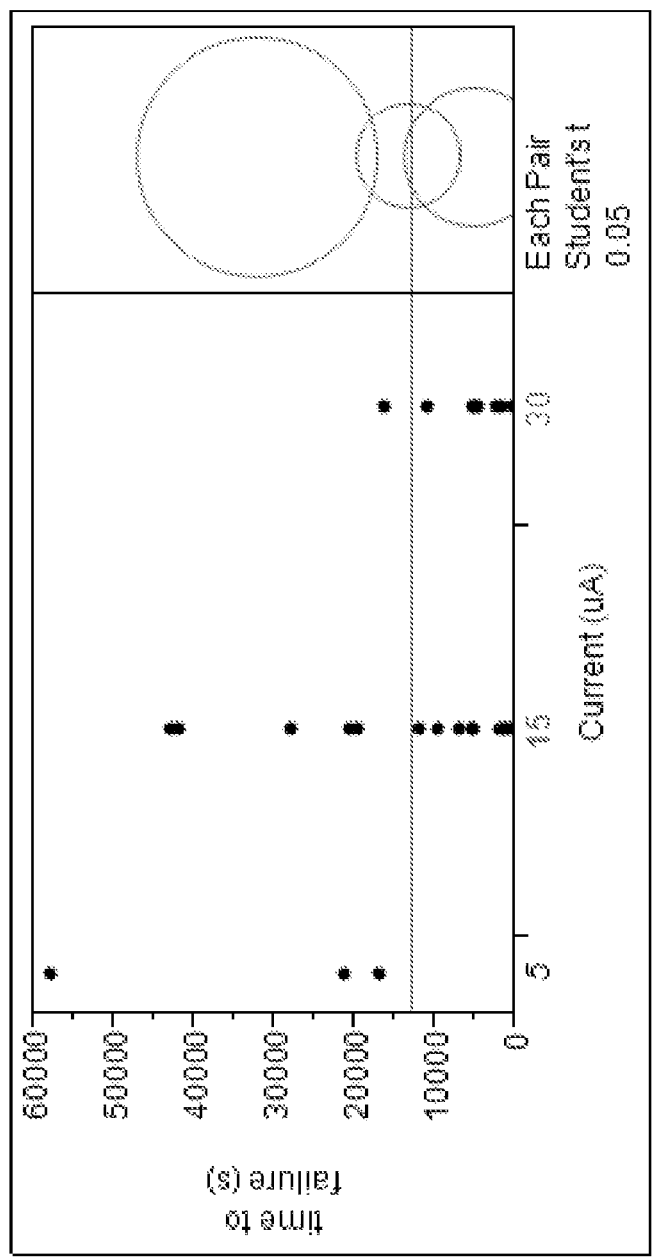
FIG. 6 is a simplified diagram illustrating lifetime of a battery cell operated with different pulse currents.

FIG. 6 presents experimental data illustrating lifetime of a battery cell operated with different pulse currents. Using a test platform with iron back contact of area 0.28 cm² and LiPON solid-state electrolyte of about 400 nm thickness with a pressed lithium foil as lithium source and top electrode, current was run in DC or pulsed modes until failure was measured by a voltage drop towards 0V from the plating (stripping) voltage. The plated charge at cell failure was calculated from $Q_{net} = Q_{plate} - Q_{strip}$. From the top to bottom, the circles represent pulsed current of 5, 15, and 30 uA. An increase in the plating current increases the time to failure. This result is consistent with DC plating results in FIG. 5.

A statistical analysis of failure in cells with geometry as described above is summarized in the following table:

TABLE 1

| Plated charge [mC] at cell failure | Lowest quartile (25%) | Lowest 10% |
| --- | --- | --- |
| DC plating | 18.6 | 1.5 |
| Pulse plating | 53.6 | 15 |

As shown in table 1 above, samples have a much higher reliability (measured in plated charge at cell failure) for pulse plating, than DC plating. For the lowest 10% where the earliest failures occur, pulse plating is as much as 10 times (15 mC v. 1.5 mC) more reliable than DC plating. This is an important reliability metric for a product since it is desirable that the earliest onset of failures occurs at as late a time as possible. At the lowest quartile, pulse plating can provide lifetime of about 3 times (53.6 mC v. 18.6 mC) longer than DC plating. By having much higher reliability rating at lowest quartile and lowest decile, devices with pulse plating can last longer and be more safe than the device with DC plating.

It is to be understood that while above description provides exemplary parameters for electrochemical device structures and operations thereof, actual parameters depend on specific implementations, and should not unduly limit the claims. For example, a large number of battery cells may be stacked in parallel, and as a result a large current is needed to charge these battery cells, cause lithium material to plate the anode region, and/or remove the lithium dendrite.

According to certain embodiments, battery cells are managed by a battery management system (BMS), which stores information related to the properties of the battery cells. Among other things, state of charge information and parameters for charging with pulsed current are stored in the BMS. When the battery cells are to be charged, parameters for the pulsed current are determined based on the information stored in the BMS. In a specific embodiment, the BMS comprises a charging mechanism that converts constant DC current received from a charging station to a pulsed current suitable for charging the battery cells.

According to an embodiment, a BMS includes sensor that monitors the state of charge for the battery cells. The anode regions of the battery cells are characterized by variable thicknesses associated with the number of life cycles of the battery device. For example, once a battery device cycles many times, the thickness of the anode region(s) increases as result of lithium material permanently deposited at the anode regions. The BMS system, by monitoring the thickness of the anode region, can determine charging characteristics for the battery device.

In certain embodiments, charging with a pulsed current is performed by a charging device. For example, battery cells together form a battery pack, which essentially powers the drivetrain of an electric vehicle (EV). To charge, the battery pack is plugged into a charging device, which can be a commercial charging station or a home charging setup. The charging device is configured to generate a pulsed current to charge the battery pack. In a specific embodiment, the charging device obtains information related to the characteristics of the battery pack and/or the battery cells (state of charge, state of health, etc.), and various parameters (e.g., pulse magnitude, duration, plating efficiency, etc.) of the pulsed current are determined accordingly. In addition to generating a pulsed current, the charging device may additionally be adapted to perform other tasks, such as performing AC/DC power conversion, regulating power supply, and others.

Alternately, a battery charging station may be configured so as to deliver pulsed current for charging of electrical applications. Electric vehicle charging requires high power delivery, thus the charging station will need particular high power switching electronics to be able to switch high currents. For example, level 1 charging requires 120 VAC at 16 A, level 2 charging requires 208 VAC and 12-80 A (roughly 2-20 kW), and level 3 requires 300-600 VDC and up to 400 A (up to 240 kW).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A lithium battery device comprising:
    a lithiated cathode region having a first surface and a second surface;
    a cathode current collector overlying the first surface of the lithiated cathode region;
    a solid electrolyte region having a third surface and a fourth surface, the third surface interfacing the second surface, the solid electrolyte region being characterized by a ionic conductivity of at least $10^{-7}$ S/cm;
    an anode region having a fifth surface and a sixth surface, the fifth surface interfacing the fourth surface; and
    an anode current collector overlaying the sixth surface, wherein the anode current collector comprises a layer of aluminum metal;
    wherein the anode region is formed by in-situ application of a plurality of current pulses between the cathode current collector and the anode current collector;
    wherein the solid electrolyte region comprises a layer of lithium-stuffed garnet solid electrolyte; and further comprising a dendrite layer within the proximity of the anode region, the plurality of current pulses being configured to remove at least a part of the dendrite layer.

2. The device of claim 1, wherein the anode region is characterized by a variable thickness, the variable thickness being associated with a state of charge of the lithium battery device.

3. The device of claim 1, wherein the anode region is characterized by a variable thickness, the variable thickness being associated with the first pulse current.

4. The device of claim 1, wherein the anode region is characterized by a variable thickness, the variable thickness being associated with a number of life cycles of the lithium battery device.

5. The device of claim 1, wherein the anode region is characterized by a variable thickness and further comprises a sensor for monitoring a state of charge.

6. The device of claim 1, wherein the lithium-stuffed garnet solid electrolyte has a thickness of less than 50 microns.

7. The device of claim 1, wherein the anode region is a lithium metal anode.

* * * * *